United States Patent
Tang et al.

(10) Patent No.: US 9,649,601 B2
(45) Date of Patent: *May 16, 2017

(54) COMPOSITE MEMBRANES FOR OLEFIN/PARAFFIN SEPARATION

(71) Applicant: BETTERGY CORPORATION, Peekskill, NY (US)

(72) Inventors: Zhong Tang, Croton-on-Hudson, NY (US); Lin-Feng Li, Croton-on-Hudson, NY (US)

(73) Assignee: BETTERGY CORP., Peekskill, NY (US)

( * ) Notice: Subject to any disclaimer, the term of this patent is extended or adjusted under 35 U.S.C. 154(b) by 105 days.

This patent is subject to a terminal disclaimer.

(21) Appl. No.: 14/705,100

(22) Filed: May 6, 2015

(65) Prior Publication Data

US 2015/0321141 A1    Nov. 12, 2015

Related U.S. Application Data

(60) Provisional application No. 61/990,214, filed on May 8, 2014.

(51) Int. Cl.
*B01D 53/22*    (2006.01)
*B01D 71/02*    (2006.01)
(Continued)

(52) U.S. Cl.
CPC ........... *B01D 71/028* (2013.01); *B01D 53/02* (2013.01); *B01D 53/228* (2013.01); *B01D 53/229* (2013.01); *B01D 63/00* (2013.01); *B01D 67/0051* (2013.01); *B01D 67/0069* (2013.01); *B01D 69/02* (2013.01); *B01D 69/10* (2013.01);
(Continued)

(58) Field of Classification Search
CPC ................ B01D 53/228; B01D 53/229; B01D 2053/221; B01D 67/0051; B01D 67/0069; B01D 67/009; B01D 69/10; B01D 69/12; B01D 71/022; B01D 71/028; B01D 2257/7022; B01D 2323/08; B01D 2323/345

See application file for complete search history.

(56) References Cited

U.S. PATENT DOCUMENTS 4,699,892 A * 10/1987 Suzuki ............... B01D 67/0051
502/4
4,853,202 A    8/1989 Kuznicki
(Continued)

OTHER PUBLICATIONS

Tiscornia, Ines et al., "Separation of propylene/propane mixtures by titanosilicate ETS-10 membranes prepared in one-step seeded hydrothermal synthesis", Journal of Membrane Science, 311, 2008, pp. 326-335.*

(Continued)

*Primary Examiner* — Jason M Greene
(74) *Attorney, Agent, or Firm* — Karl F. Milde, Jr.; Eckert Seamans Cherin & Mellott, LLC

(57) ABSTRACT

This invention presents a metal-doped zeolite membrane-based apparatus containing molecular sieving zeolite thin film on the seeded porous substrate. The metal-doped zeolite membrane exhibits high selectivity to olefin over paraffins. The membrane is synthesized by seed coating and secondary growth method, followed by metal doping and post treatment processes.

20 Claims, 4 Drawing Sheets

(51) Int. Cl.
  *B01D 67/00* (2006.01)
  *B01D 69/12* (2006.01)
  *B01D 63/00* (2006.01)
  *B01D 53/02* (2006.01)
  *B01D 69/02* (2006.01)
  *B01D 69/10* (2006.01)

(52) U.S. Cl.
  CPC ........... *B01D 69/12* (2013.01); *B01D 71/022* (2013.01); *B01D 2053/221* (2013.01); *B01D 2253/108* (2013.01); *B01D 2257/7022* (2013.01); *B01D 2323/08* (2013.01); *B01D 2323/345* (2013.01); *B01D 2325/12* (2013.01)

(56) References Cited

U.S. PATENT DOCUMENTS

| | | | |
|---|---|---|---|
| 5,672,388 A * | 9/1997 | McHenry | B01D 71/028 427/248.1 |
| 5,744,687 A | 4/1998 | Ramachandran et al. | |
| 5,763,347 A | 6/1998 | Lai | |
| 5,779,904 A * | 7/1998 | Ruderman | B01D 67/0051 210/490 |
| 6,414,202 B1 | 7/2002 | Baker et al. | |
| 6,517,611 B1 | 2/2003 | Kuznicki et al. | |
| 6,525,236 B1 | 2/2003 | Baker et al. | |
| 7,119,245 B1 * | 10/2006 | Thoma | B01D 67/0051 208/106 |
| 7,479,227 B2 | 1/2009 | Da Costa et al. | |
| 9,126,830 B2 * | 9/2015 | Tang | B01D 67/009 |
| 2003/0168407 A1 * | 9/2003 | Kusakabe | B01D 53/228 210/650 |
| 2005/0014371 A1 * | 1/2005 | Tsapatsis | B01D 71/028 438/689 |
| 2006/0201884 A1 * | 9/2006 | Kulprathipanja | B01D 71/028 210/651 |
| 2009/0270665 A1 * | 10/2009 | Magalhaes Mendes | B01D 53/228 585/259 |
| 2012/0024777 A1 * | 2/2012 | Sugita | B01D 53/228 210/500.25 |
| 2012/0031833 A1 * | 2/2012 | Ho | B01D 67/0051 210/488 |
| 2012/0074065 A1 * | 3/2012 | Satou | B01D 71/028 210/653 |
| 2015/0044130 A1 | 2/2015 | Tang et al. | |
| 2015/0065767 A1 | 3/2015 | Henao et al. | |

OTHER PUBLICATIONS

A.F. Ismail, L.I.B. David, J. Membrane Sci., 2001, 193, 1-18.

I.G. Giannakopoulos, V. Nikolakis, Ind. Eng. Chem. Res., 2005; 44,226-230.

I. Tiscornia, S. Irusta, C. Tellez, J. Coronas, J. Santamatia, Journal of Membrane Science, 2008, 311, 326-335.

* cited by examiner

COMPOSITE MEMBRANES FOR OLEFIN/PARAFFIN SEPARATION

CROSS-REFERENCE TO RELATED APPLICATION

This application is based upon and claims the benefit of the priority of the filing date of U.S. Provisional Patent Application Ser. No. 61/990,214, filed May 8, 2014, which is incorporated herein by reference in its entirety.

STATEMENT REGARDING FEDERALLY SPONSORED RESEARCH OR DEVELOPMENT

The work described here was supported by The Small Business Innovation and Research Program (NSF Grant No. IIP-1247577). The Federal Government may have certain rights in this invention.

FIELD OF THE INVENTION

The present invention is directed to a metal-doped zeolite membrane, methods for making the zeolite membrane, and methods of separating olefins from paraffins using the zeolite membrane. The zeolite membrane comprises molecular sieving zeolite thin film with high selectivity to olefin over paraffins. The membrane is synthesized by seed coating and secondary growth method, and delivers high flux and selectivity with excellent durability.

BACKGROUND OF THE INVENTION

Olefins are the basic industrial synthetic building blocks for producing common plastics: synthetic fibers, glycols, and various surfactants. Ethylene and propylene are typically produced via steam cracking of naphtha, ethane, and other hydrocarbon feedstock, followed by distillation. In the conventional distillation process, ethylene/ethane, or propylene/propane mixtures are liquefied for cryo-distillation in large fractionating columns, which involves phase change and consumes a huge amount of energy. To reduce the energy consumption, alternative technologies have been actively sought after in both industry and academic research community. As a result, a number of processes have been proposed to solve the problem. Adsorption appears to be an attractive alternative because of the maturity of the basic technology. However, to obtain the olefin products with desirable purity, pressure-, vacuum-, and temperature-swing adsorption (PSA, VSA, and TSA) processes have to be operated in at least a four-bed, five-step fashion that results in a high energy demand and a large capital investment.

Membrane separation for olefin/paraffin mixtures offers an appealing energy-efficient alternative to the cryo-distillation process. Great effort has been dedicated in developing a high flux, high selectivity olefin separation membrane. The state-of-the-art membrane cannot meet the stringent requirements of real life olefin/paraffin separation, mainly due to problems such as trade-off between selectivity and flux; poor stability, especially in practical operating environments; and fouling or poisoning in the presence of contaminants (Olefin, alkynes, dienes, olefin sulfide, and other sulfur species).

Membrane candidates have been proposed ranging from polymers, ceramics, to the composites of polymers and ceramics. Although polymeric membranes have been used successfully in several gas separation applications, including nitrogen production from air and olefin removal from refinery streams, the selectivity and gas fluxes of such membranes are inadequate for separating olefins from saturated hydrocarbons. Under industrial operating conditions, those polymeric membranes suffer from plasticization. Even the best polymeric membranes can only offer olefin/paraffin selectivity of 4-5. To replace or supplement for the separation of olefin/paraffin in steam crackers or propane de-olefination plants, membranes with selectivity of twenty or more are needed.

Facilitated transport membranes have attracted research interest for a long time. Facilitated transport membranes incorporate a reactive carrier in the membrane, which reacts with and helps transport one of the components of the feed across the membrane. High loadings (more than 80 wt % or 40 vol %) of silver salt ($AgBF_4$) as the carrier were normally used in the polymer membranes. Mixed-gas ethylene/ethane selectivity of more than 50 has been reported (U.S. Pat. Nos. 6,414,202, 6,525,236, and 7,479,227). The main hurdles, however, include the lack of carrier stability due to washout of silver ions and the need for water vapor in the feedstock. While complexing with olefins, the carriers also tend to react with other species causing undesirable carrier deactivation or poisoning over short time.

Inorganic membranes, such as carbon membranes (A. F. Ismail, L. I. B. David, *J. Membrane Sci.*, 2001, 193, 1-18), and zeolite membranes have also been investigated for the separation of olefin/paraffin gas mixtures. Inorganic membranes have much greater thermal and chemical stability than polymer membranes. A few studies have indicated that zeolite membranes, specifically FAU (pore size 0.74 nm), and ETS-10 (pore size ~0.56 nm) zeolite membrane, can separate olefins from paraffins. It has been reported that FAU-type zeolite membranes synthesized by secondary growth method can reach a separation factor for propylene/propane mixtures of 13.7±1 at 100° C., with the corresponding propylene permeance of $0.75 \times 10^{-8}$ mol/m$^2$·s·Pa, which surpassed the performance of polymer membranes as well as carbon membranes (I. G. Giannakopoulos, V. Nikolakis, *Ind. Eng. Chem. Res.*, 2005, 44, 226-230). Tiscornia et al, reported a method to prepare an ETS-10 zeolite membrane and its application in propylene/propane separation (I. Tiscornia, S. Irusta, C. Tellez, J. Coronas, J. Santamatia, *Journal of Membrane Science*, 2008, 311, 326-335). The membrane can only achieve propylene/propane selectivity of about 3-5. Hence, the separation factors of these pristine membranes are not high enough for practical olefin and paraffin separation in the industry.

ETS-10 zeolite with mixed a coordination metallosilicate framework and general formula $Na_2TiSi_5O_{13}$ was first discovered by Kuznicki et al. (U.S. Pat. No. 4,853,202 and U.S. Pat. No. 6,517,611). The modified. ETS-10 zeolite powders were reported to be a good candidate to selectively adsorb ethylene over ethane (U.S. Pat. No. 8,017,825). The powder cannot be used for continuous separation of olefin from paraffin.

SUMMARY OF THE INVENTION

It is known that olefins (e.g., ethylene and propylene) have unique affinity to silver and silver ion (I) species. Silver-salt-based polymer membranes have higher olefin selectivity mainly through facilitated transport mechanism. It also known that zeolites possess excellent ion-exchange ability. By means of silver ion-exchange, Ag can be introduced inside pores of the zeolite membrane, which can not only fine tune the pore size but also provide great selectivity toward ethylene, A metal-containing modified agent can passivate the external surface and control the pore size of the zeolite. The pore structure of zeolites can thus be modified by introducing new species through various techniques, such as ion exchange, impregnation, chemical vapor deposition, or atomic layer deposition.

According to a method of the invention for preparing a composite zeolite membrane, a porous substrate is coated to form one or more seed layers on the porous substrate, and then the seeded substrate is put in contact with a precursor. The precursor and seeded substrate are heated under hydrothermal conditions to form a zeolite membrane having a framework, and then the zeolite membrane is subjected to metal doping.

The porous substrate can be selected from the group consisting of porous glass, porous carbon, porous ceramic, porous metal, and composites of two or more thereof. Also, the porous substrate can be in a typically useful shape, such as flat sheets, disks, tubes, or cylinders.

The porous substrate may be coated with a seed suspension.

With regard to metal doping, one or two metals are doped on specific sites of the zeolite membrane framework. The zeolite membrane framework has channels of zeolite pores and the doping sites are in the channels. The metal doped on the zeolite membrane framework is a transition metal or an alloy thereof, and preferably the transition metal is selected from the group consisting of transition metals of Groups IB, IIB, and VIII of the Periodic Table, more preferably the transition metal is selected from the group consisting of transition metals of Groups IB and VIII of the Periodic Table, Most preferably the transition metal is/are one or two of the group consisting of copper, silver, gold, cobalt, nickel, ruthenium, and palladium in the form of an alloy.

The metal doping is carried out by one or more of the processes selected from the group consisting of melting salt vapor deposition, plasma treatment, and ion exchange.

A dip-coating technique can be used for adhering nanoparticle seeds to the porous substrate to make the seeded substrate. Optionally spray coating or sputtering may be employed.

Preferably the nanoparticle seeds are dispersed in a suspension with a final pH value of from 6-8. The coating may comprise a further step of coating the porous substrate with a zeolite nanoparticle suspension one or more times to form one or more seeded layers on the seeded substrate.

A metal-doped zeolite membrane prepared by the method described above is particularly useful for separating olefins from paraffins.

In an aspect of the invention, a metal-doped zeolite membrane is useful for olefin/paraffin separation, wherein the membrane comprises a porous substrate and a zeolite layer with metal doping.

In another aspect of the invention, a metal-doped zeolite membrane comprises a zeolite layer with ETS-10 framework structure.

In another aspect of the invention, a metal doped zeolite membrane comprises heteroatoms incorporated into ETS-10 silica framework.

In another aspect of the invention, the zeolite membrane framework has channels of zeolite pores and there are sites in the channels.

In another aspect of the invention, a doping metal is a transition metal of Group IB, IIB, or VIII of the Periodic Table, an alloy thereof, or a combination thereof.

In another aspect of the invention, a doping metal is a transition metal of Group IB or VIII of the Periodic Table, an alloy thereof, or a combination thereof.

In another aspect of the invention, a method for making a composite zeolite membrane comprises the steps of:
providing a porous substrate;
coating the porous substrate to form one or more seed layers;
providing a precursor;
placing the precursor in contact with the seeded substrate;
heating the precursor and seeded substrate under hydrothermal conditions to form a zeolite membrane having a framework; and
subjecting the zeolite membrane to metal doping.

In another aspect of a method of the invention, the porous substrate is selected from the group consisting of porous glass, porous carbon, porous ceramic, porous metal, and composites of two or more thereof.

In another aspect of a method of the invention, the porous substrate is in the shape of one of flat sheets, disks, tubes and cylinders.

In another aspect of a method of the invention, the porous substrate is coated with a seed suspension.

In another aspect of a method of the invention, a metal is doped on specific sites of the zeolite membrane framework.

In another aspect of a method of the invention, the zeolite membrane framework has channels of zeolite pores and the sites are in the channels.

In another aspect of a method of the invention, the metal doping is carried out by one or more of the processes selected from the group consisting of melting salt vapor deposition, plasma treatment, and ion exchange.

In another aspect of a method of the invention, the zeolite membrane framework comprises an ETS-10 structure.

In another aspect of a method of the invention, forming a seeded layer on a porous substrate, comprises the steps of:
providing a porous substrate having a receptive outer surface;
providing nanoparticle seeds comprising NaCl, KCl, KF, $TiO_2$, $Na_2SiO_3$, and $H_2O$;
adhering the nanoparticle seeds to the outer surface of the porous substrate to form a seeded substrate; and
subjecting the seeded substrate to temperature programming calcination.

In another aspect of a method of the invention, the porous substrate is selected from the group consisting of porous glass, porous carbon, porous ceramic, porous metal, and composites of two or more thereof.

In another aspect of a method of the invention, a dip-coating technique is used for adhering nanoparticle seeds to the porous substrate to make the seeded substrate.

In another aspect of a method of the invention, the method comprises the further step of coating the porous substrate with a zeolite nanoparticle suspension one or more times to form one or more seeded layers on the seeded substrate.

In another aspect of a method of the invention, the coating is carried out by one of dip coating, spray coating, and sputtering.

In another aspect of the invention, a metal-doped zeolite membrane is prepared by the method described above.

In another aspect of the invention, a molecular sieve comprises a metal-doped zeolite membrane prepared by the method described above.

In another aspect of the invention, an apparatus for olefin separation from an olefin/paraffin mixture comprises metal-doped zeolite membrane wherein the membrane comprises a porous substrate and a zeolite layer thereon having pores with metal clusters in the zeolite pores.

In another aspect of an apparatus of the invention, the zeolite membrane comprises transition metal clusters in the zeolite pores.

In another aspect of an apparatus of the invention, the zeolite membrane comprises one or two seed layers and one or two continuous zeolite layers on porous substrate.

In another aspect of an apparatus of the invention, a seed layer is prepared by coating a zeolite seed suspension onto the porous substrate by rubbing, spraying, dip-coating, or slip-coating.

In another aspect of an apparatus of the invention, the seed suspension is made from a homogenous precursor through hydrothermal synthesis.

In another aspect of an apparatus of the invention, the continuous zeolite layer comprises Y-type zeolite.

In another aspect of an apparatus of the invention, the continuous zeolite layer comprises ETS-10 type zeolite.

Another aspect of the invention comprises an improved method of separating olefins from paraffins using a molecular sieve described above as the catalyst.

In another aspect of a method of the invention, the improved method is carried out at high temperature ranging from 0° to 100° C.

BRIEF DESCRIPTION OF THE DRAWINGS

This invention may be more readily understood by reference to the following drawings wherein.

DETAILED DESCRIPTION OF THE INVENTION

Figure 1A:
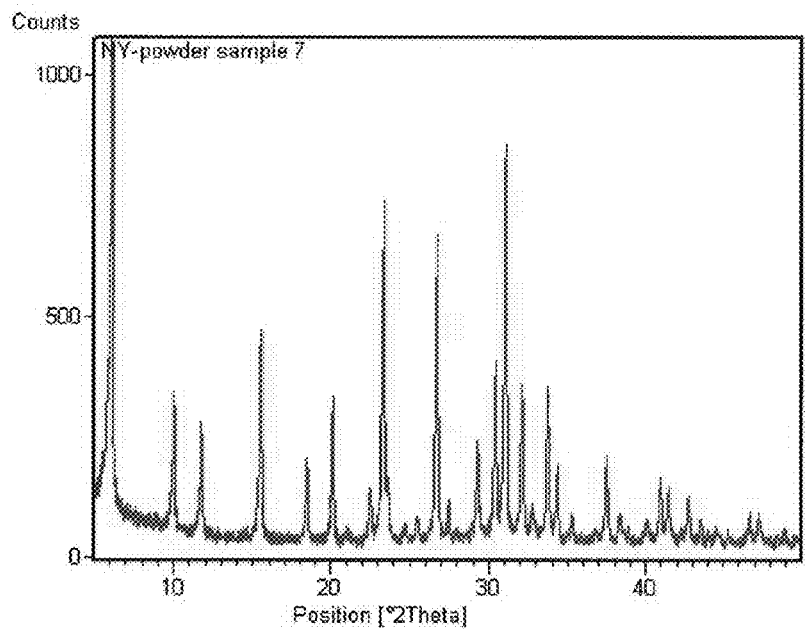
FIGS. 1(a) and 1(b) represent x-ray diffraction patterns of Y-type zeolite and ETS-10 zeolite, respectively.

In accordance with this invention, a composite zeolite membrane is prepared by the following procedure: (1) zeolite membrane is grown on a treated porous substrate (either uncoated or nano-scale zeolite seed coated); (2) a template removal step (if necessary); and (3) metal doping of the membrane. It should be noted that each step mentioned above involves a unique technique specially employed to obtain a composite membrane in which specific molecules permeate through the membrane with high selectivity as well as high permeability.

With reference to the above-mentioned procedure, the porous substrates include a disk shaped, tubular, or hollow fiber porous ceramic, porous silica, metal mesh, or a sintered porous metallic support. Ceramic porous materials are preferred to be the substrates in this invention because of their good affinity to the zeolite materials. Optional seed materials include various zeolite nano-particles, zirconia, and titania. Transition metals or metal alloys with absorption/adsorption property and structure integrity can be selected as doping materials to be dispersed in the zeolitic pores by means of ion-exchange, melt salt vaporization, plasma irradiation, or photo-assisted irradiation.

The following examples are presented to better describe this invention. These examples are used to illustrate the process for zeolite membrane preparation, and not necessarily represent the best formula. It is noted that, this invention is not limited by the following examples. The chemicals used in this work included potassium chloride (99%, Aldrich), potassium fluoride (99%, Aldrich), sodium chloride (99.995%, Aldrich), sodium hydroxide (98%, Aldrich), sodium silicate solution ($Na_2SiO_3$: 27% $SiO_2$, 8% $Na_2O$, Aldrich), sodium alum Mate (50-56% Al+40-45% Na (Fe<0.05%), Riedel-de Haen), titanium(III) chloride solution ($TiCl_3$/HCl, >12%, Aldrich), anatase (P-25, Aldrich), and titanium butoxide. The propylene (99.5%), propane (ACS grade) gases were obtained from Airgas.

EXAMPLES

Example 1. Preparation of Zeolite Nanoparticle Suspension (a) Y-Type Zeolite Nano-Particles.

The Y-type zeolite nanoparticle seeds were prepared by hydrothermal synthesis. Amounts of $NaAlO_2$ (2.78 g)+NaOH (12.67 g)+distilled water (149.91 g) were mixed and then stirred for 30 minutes. Water glass (41.83 g) was added, and the mixture was stirred for 12 hours. The resulting mixture was transferred into a bottle made of polytetrafluoroethylene (hereinafter, TEFLON®) for hydrothermal synthesis at 90° C. for 12 hours. After the hydrothermal synthesis, the resulting seed suspension was washed to a pH of 8~9 for further use.

(b) ETS-10 Zeolite Nanoparticles.

Sodium silicate solution was mixed with 15.4 g distilled water, 2.47 g sodium hydroxide, 2.33 g sodium chloride, and 3.63 g potassium chloride. This mixture was thoroughly stirred until a solution was obtained. Titanium dioxide (1.7 g) was then added with stirring, and a homogeneous gel formed. Static crystallization was carried out in TEFLON®-lined autoclaves at 220° C. for 24 hours. The products were then washed with distilled water to a pH between 9-10. The gel composition was 4.7 $Na_2O$:1.5 $K_2O$:$TiO_2$:5.5 $SiO_2$:122 $H_2O$.

The resultant zeolite nano-particle suspension was re-dispersed in distilled water to obtain a suspension with a dry solid concentration ranging from 0.1-10 wt %, 0.1 wt % hydroxyl propyl cellulose (HPC, Mw=100,000, Aldrich) solution was used as binder. The final stable colloidal suspension contained 0.1-10 wt %, preferably 0.5-2 wt %, of dry particles. The nanoparticle suspension was coated onto the polished side of a disc substrate by dip-coating. The contact time of the dip-coating process was 3-5 seconds or 3-5 minutes, dependent upon the affinity of seeds and substrates. After dip-coating, the disc was dried at room temperature and stored in an oven.

Example 2. Preparation of Membrane #Y-1, and Separation Performance

This example is directed to the preparation of zeolite membrane #Y-1. The precursor solution for secondary growth was prepared in a TEFLON® beaker by dissolving 1.235 g $NaAlO_2$ and 6.965 g NaOH in 88.86 g de-ionized water, under rigorous stirring. After addition of 15.5 g water glass and stirring for another six hours at room temperature, the precursor was transferred into the TEFLON®-lined synthesis vessels. The seeded alumina disc was placed vertically at the bottom of the vessel and completely immersed in the synthesis solution about 1 cm below the liquid surface. The container was then moved into an oven to perform hydrothermal synthesis at 100° C. for 12 hours. The membrane was taken out, washed with distilled water, and dried at 70° C. overnight. The membrane was then subjected to a second hydrothermal synthesis. This membrane was characterized by X-ray diffraction (XRD, Rigaku D/MAX-II), showing the pattern set forth in FIG. 1(a).

For ion-exchange, the membrane prepared was placed into 0.04 M $AgNO_3$ solution (10 ml) at room temperature for one hour. The membrane was then dried overnight at room temperature in a vacuum oven. After drying, the membrane was subjected to temperature program reduction under 5% (v) $H_2$ (balanced with nitrogen) environment. This membrane showed a propylene selectivity of 1.29 over propane.

Example 3. Membrane #Y-2 Synthesis and Separation Performance

Membrane #Y-2 preparation and ion-exchange process were the same as in Example 2, except that the membrane was subjected to calcination under a nitrogen environment. After calcination, the membrane was subjected to UV irradiation. This membrane showed a propylene selectivity of 1.31 over propane.

Example 4. #M-1 Zeolite Membrane Synthesis and Separation Performance

This example shows the preparation procedure for ETS-10 zeolite membrane. ETS-10 zeolite membrane (#M-1) was synthesized by secondary growth method with the following procedure: 2.47 g NaOH was added into 20.0 g $Na_2SiO_3$ solution with additional water of 15.4 g, stirring at room temperature for 30 minutes. Amounts of 3.63 g KCl, 2.33 g NaCl, and 1.5 g KF were added into 15.4 g de-ionized water, and the resulting solution was stirred for five minutes. The two solutions were mixed, and the solution mixture was stirred for another 30 minutes. $TiCl_3$ solution (10.7 g 15% $TiCl_3$ solution) was added to the solution mixture, with stirring at room temperature for 30 minutes. The precursor was transferred into an autoclave with seeded substrate, and sealed with a TEFLON® liner. The autoclave was placed in an oven for secondary growth synthesis at 200° C. for 24 hours. After cooling down to room temperature, the membrane was taken out and rinsed with de-ionized water. The membranes were dried at 80° C. in an oven overnight, and further dried at 300° C. with both heating rate and cooling rate of 1° C./min for eight hours. This membrane showed a propylene selectivity of 4.5 over propane.

Example 5. #M-2 Zeolite Membrane Synthesis and Separation Performance

This example shows the preparation procedure for metal-doped ETS-10 zeolite membrane and its separation performance. ETS-10 zeolite membrane (#M-2) was synthesized by secondary growth method with the following procedure: 1.3 g KCl, 6.9 g NaCl, and 1.5 g KF were added into 20.0 de-ionized water with stirring for five minutes. An amount of 20.0 g $Na_2SiO_3$ solution was then added to the above mixture with stirring at room temperature for 30 minutes. An amount of 1.3 g anatase was added with stirring at room temperature for 3-4 hours. The precursor was then transferred into an autoclave with seeded substrates, sealed with a TEFLON® liner. The autoclave was placed in an oven for hydrothermal synthesis at 220° C. for 24 hours. After cooling down to room temperature, the membrane was taken out and rinsed with the de-ionized water. The membranes were dried overnight in an oven at 80° C. before ion-exchange. The process of ion-exchange was conducted over the membranes by using silver nitrate solution (0.125 N) to ensure a certain amount of Ag ions doping in the zeolitic channels. The ion-exchanged membrane was subjected to post-treatment by UV irradiation.

Figure 1B:
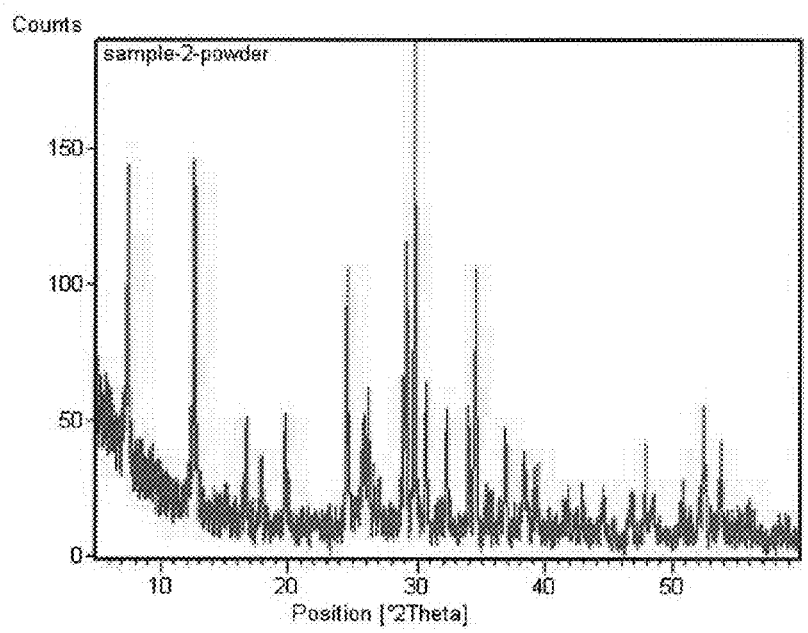
Figure 2:
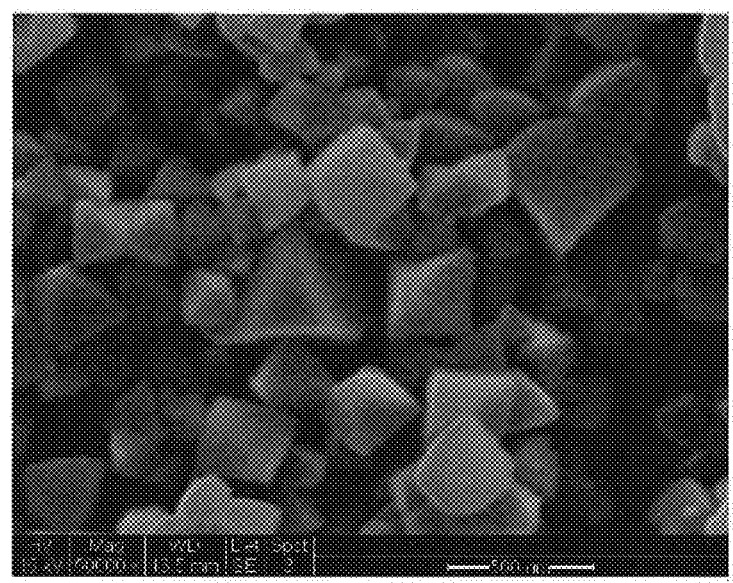
FIG. 2 represents a scanning electron microscopy (SEM) image of the ETS-10 zeolite membrane.

The crystal growth was examined by x-ray diffraction, as shown in FIG. 1(b). The membrane integrity was observed by using scanning electron microscope (SEM, Philips XL30), a pictograph of which is shown in FIG. 2, Upon Ag ion modification and post treatment, this zeolite composite membrane gave separation performance with propylene selectivity of 106.5.

Example 6. #M-3 Zeolite Membrane Synthesis and Separation Performance

This example shows the preparation procedure for metal-doped ETS-10 zeolite membrane. ETS-10 zeolite membrane (#M-3) was synthesized by secondary growth method with the following procedure: 2.47 g NaOH was added into 20.0 g $Na_2SiO_3$ solution with additional water of 15.4 g, under stirring at room temperature for 30 minutes. Amounts of 3.63 g, KCl, 2.33 g NaCl, and 1.5 g KF were added into 15.4 g de-ionized water, under stirring for five minutes. The above two solutions were mixed, and the mixed solutions were stirred for another 30 minutes. $TiCl_3$ solution (10.7 g 15% $TiCl_3$ solution) was added to the solution mixture, under stirring at room temperature for 30 minutes. The precursor was transferred into an autoclave with seeded substrate, and sealed with a TEFLON® liner. The autoclave was placed in an oven for secondary growth synthesis at 200° C. for 24 hours. After cooling down to room temperature, the membrane was taken out and rinsed with the de-ionized water. The membranes were dried overnight in an oven at 80° C. before ion-exchange.

The process of ion-exchange was conducted over the membranes by using $Ag(NH_3)_2NO_3$ solution. The ion-exchange process was similar to one with $AgNO_3$ solution. The ETS-10 membrane was placed into above mentioned $Ag(NH_3)_2NO_3$ solution (10 ml) at room temperature for 12 hours. The ion-exchanged membrane was subjected to post-treatment by UV irradiation.

Upon Ag ion modification and post treatment, this zeolite composite membrane gave separation performance with propylene selectivity as high as 98.6.

Example 7. #M-4 Zeolite Membrane Synthesis and Separation Performance

This example shows the preparation procedure for metal-doped ETS-10 zeolite membrane and its separation performance. ETS-10 zeolite membrane (#M-4) was synthesized by secondary growth method with the following procedure: 1.3 g KCl, 6.9 g NaCl, and 1.5 g KF were added into 20.0 de-ionized water with stirring for five minutes. An amount of 20.0 g $Na_2SiO_3$ solution was then added in the above mixture with stirring at room temperature for 30 minutes. An amount of 5.6 g titanium butoxide was added with stirring at room temperature for 3-4 hours. The precursor was then transferred into an autoclave with seeded substrates, sealed with a TEFLON® liner. The autoclave was placed in an oven for hydrothermal synthesis at 220° C. for 24 hours. After cooling down to room temperature, the membrane was taken out and rinsed with the de-ionized water. The membranes were dried overnight in an oven at 80° C. before ion-exchange.

A process of ion-exchange was conducted over the membranes by using $Ag(NH_3)_2NO_3$ solution. The ion-exchanged membrane was subjected to temperature programmed calcination at 450° C. in air for eight hours with a heating and cooling rate of 1° C./min. before LTV irradiation.

Upon Ag ion modification and UV irradiation, this zeolite composite membrane gave separation performance with propylene selectivity as high as 9.8.

Example 8. #M-5 Zeolite Membrane Synthesis and Separation Performance

This example shows the preparation procedure for metal-doped ETS-10 zeolite membrane. ETS-10 zeolite membrane (#M-5) was synthesized by secondary growth method with the following procedure: 2.47 g NaOH was added into 20.0 g $Na_2SiO_3$ solution with additional water of 15.4 g, stirring at room temperature for 30 minutes. Amounts of 3.63 g KCl, 2.33 g NaCl, and 1.5 g KF were added into 15.4 g de-ionized water, under stirring for five minutes. The two solutions were mixed and then stirred for another 30 minutes. $TiCl_3$ solution (10.7 g 15% $TiCl_3$ solution) was added into the mixture, and the mixture was stirred at room temperature for 30 minutes. The precursor was transferred into an autoclave with seeded substrate, and sealed with a TEFLON® liner. The autoclave was placed in an oven for secondary growth synthesis at 200° C. for 24 hours. After cooling down to room temperature, the membrane was taken out and rinsed with the de-ionized water. The membranes were dried overnight in an oven at 80° C. before ion-exchange.

The process of ion-exchange was conducted over the membranes by using $Ag(NH_3)_2NO_3$ solution. The ion-exchanged membrane was then thermally treated in nitrogen at 300° C. with a heating rate and cooling rate of 1° C./min. for eight hours. The thermally treated membrane was subjected to UV irradiation.

Upon Ag ion modification, thermal treatment and UV-irradiation, this zeolite composite membrane gave separation performance with propylene selectivity as high as 123.7.

Figure 3:
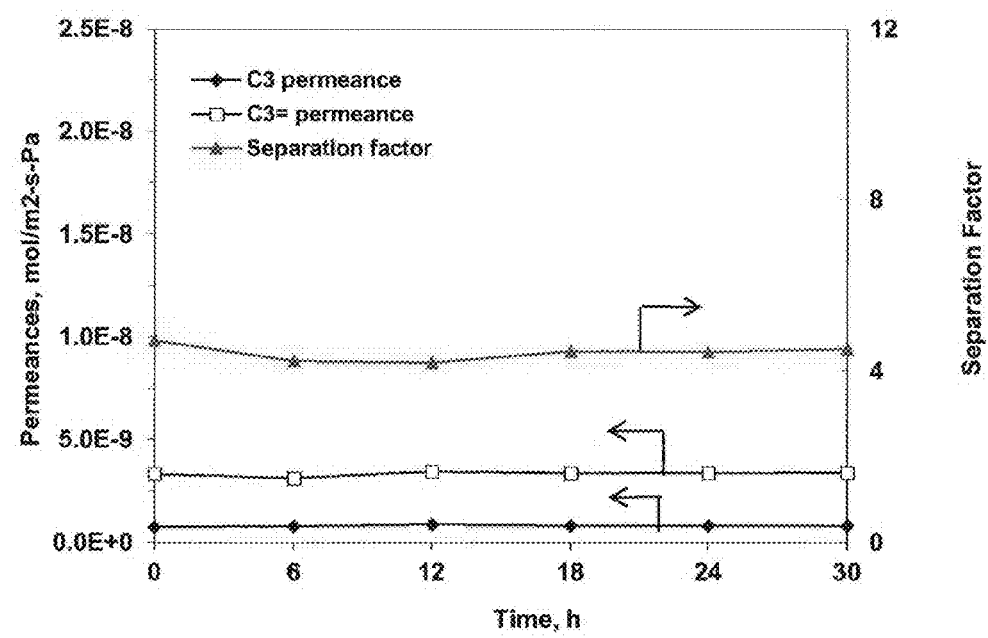
FIG. 3 is a graphical representation of the separation performance of the ETS-10 membrane without metal doping.
Figure 4:
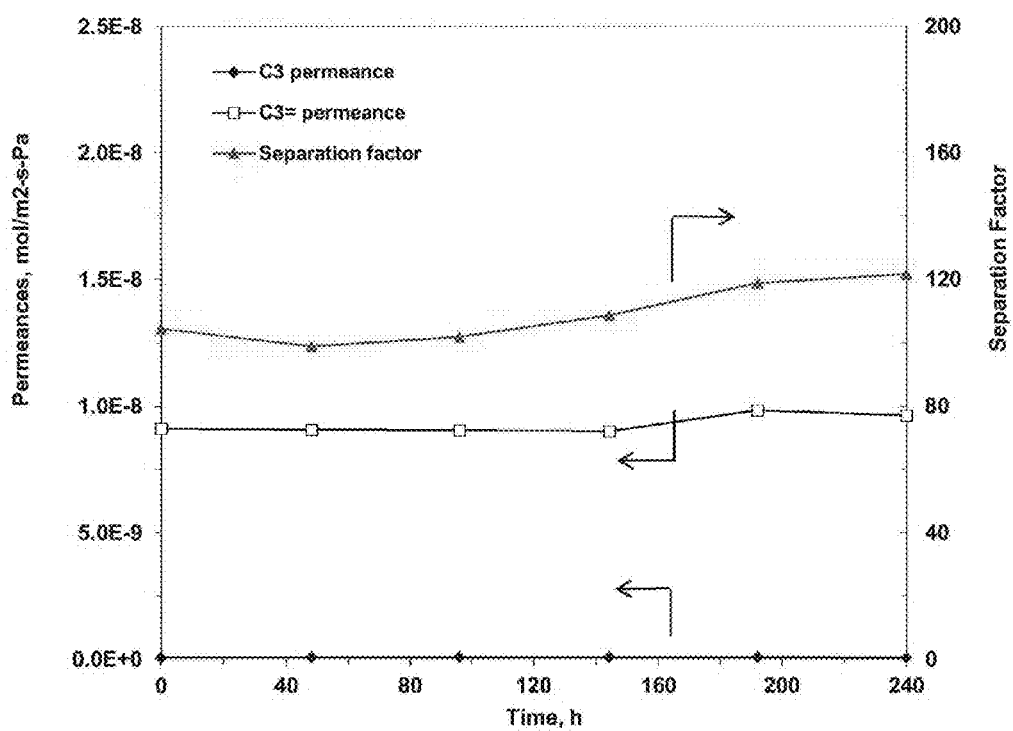
FIG. 4 is a graphical representation of the separation performance of the metal-doped ETS-10 membrane.

Separation performance of the ETS-10 membrane is set forth in FIGS. 3 and 4. In FIG. 3, which represents the separation performance of the ETS-10 membrane without metal doping, the propylene/propane selectivity is about 4.5 (triangle dot), and propylene permeance is about $0.34 \times 10^{-8}$ $mol/m^2 \cdot s \cdot Pa$ (square dot).

In FIG. 4, which represents the separation performance of the metal-doped ETS-10 membrane, the propylene/propane selectivity is about 120 (triangle dot) and propylene permeance is about $0.85 \times 10^{-8}$ $mol/m^2 \cdot s \cdot Pa$ (square dot).

Figure 5:
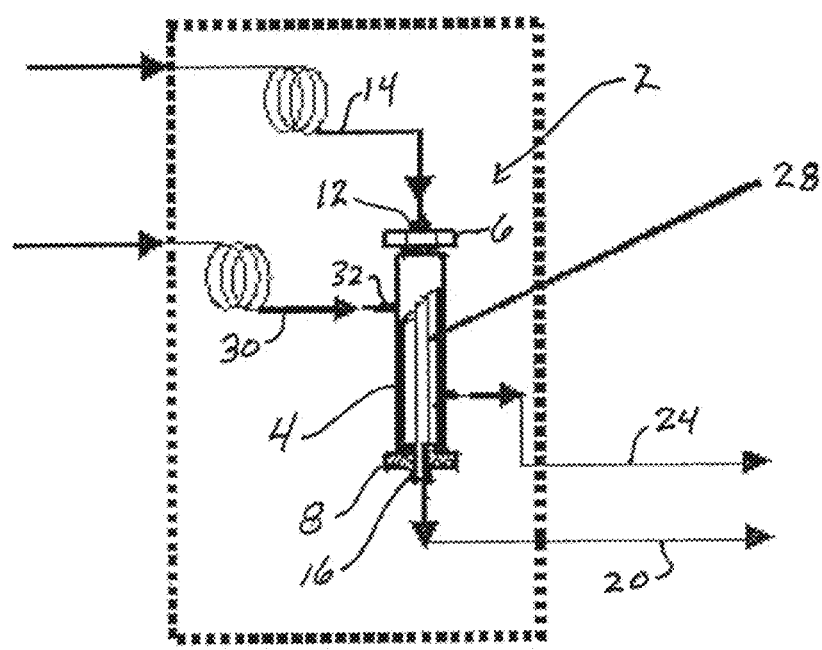
FIG. 5 is a schematic representation of a zeolite membrane-containing device for olefin/paraffin separation.

FIG. 5 is a schematic representation of a zeolite membrane-based device or apparatus useful for olefin/paraffin separation according to the invention. A device such as a cartridge 2 has a cylindrical body 4 closed with closed ends 6 and 8. Closed end 6 has an inlet 12 for receipt of olefin/paraffin feed mixture 14, and closed end 8 has an outlet 16 for retentate 20, that is, olefin depleted mixture. Cylindrical body 4 has at least one outlet 22 for permeate 24, that is, olefin enriched mixture. Cylindrical body 4 comprises zeolite membrane material, preferably arranged in cylindrical porous structures 28 of alumina covered with a metal doped zeolite layer. The cylinders 28 are arranged adjacent and parallel to each other within cylindrical body 4. Optionally a sweep gas 30 may enter cylindrical body 4 at inlet 32 to assist in collecting the permeate 24.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

We claim:

1. An apparatus for olefin separation from an olefin/paraffin mixture, comprising:
    (a) a source of fluid which includes an olefin and a paraffin;
    (b) a closed container body having an inlet coupled to said source, a first outlet for discharge of an olefin enriched fluid, and a second outlet for discharge of an olefin depleted fluid; and
    (c) a plurality of membranes disposed in said body between said inlet and second outlet, wherein the at least one of said membranes comprises a porous substrate and a metal-doped zeolite layer thereon having pores with metal clusters in the zeolite pores, wherein the clusters comprise a metal or metal alloy of at least one transition metal selected from the group consisting of copper, silver, gold, cobalt, nickel, ruthenium, and palladium.

2. The apparatus of claim 1, wherein said at least one membrane comprises one or two seed layers and one or two continuous zeolite layers on the porous substrate.

3. The apparatus of claim 2, wherein a seed layer is prepared by coating a zeolite seed suspension onto the porous substrate by rubbing, spraying, dip-coating, or slip-coating.

4. The apparatus of claim 3, wherein the seed suspension is made from a homogenous precursor through hydrothermal synthesis.

5. The apparatus of claim 2, wherein the continuous zeolite layer comprises Y-type zeolite.

6. The apparatus of claim 2, wherein the continuous zeolite layer comprises ETS-10 type zeolite.

7. The apparatus of claim 2, wherein the continuous zeolite layer is synthesized by a process comprising the steps of:
    a) placing seed substrate vertically in a polytetrafluoroethylene container;
    b) adding a homogeneous precursor containing sodium chloride, sodium hydroxide, potassium chloride, potassium fluoride, sodium silicate solution, and a source of titanium to the container;
    c) putting the polytetrafluoroethylene container into an autoclave with good sealing; and
    d) heating the autoclave in an oven for hydrothermal synthesis at a temperature in the range of from 180° to 240° C. for from 24 to 72 hours to form a continuous zeolite layer on the seeded substrate.

8. The apparatus of claim 7, wherein the source of titanium is titanium dioxide, titanium chloride, or titanium butoxide.

9. The apparatus of claim 1, wherein metal doping of the zeolite layer is achieved by vapor deposition, plasma treatment, or ion-exchange or a combination of two or more thereof.

10. The apparatus of claim 9, wherein the continuous zeolite layer is subjected to additional treatment selected from the group consisting of temperature programmed reduction, temperature programmed calcination, and UV-irradiation.

11. The apparatus of claim 1, wherein the continuous zeolite layer is fabricated in the shape of a flat-sheet, a tubular member, or a hollow fiber.

12. The apparatus of claim 1, wherein the container body comprises a canister or cylindrical structure coupled to receive a gas or liquid stream containing olefin, paraffin, and other components.

13. The apparatus of claim 12, wherein the canister or cylindrical structure is coupled to receive a gas stream containing an olefin.

14. The apparatus of claim 13, wherein the olefin-containing gas is mixed in a feedstock containing paraffin and other components.

15. The apparatus of claim 12, which comprises a canister or cylindrical structure coupled to receive a gas or liquid stream containing ethylene and ethane, propylene and propane, or butylene and butane, and other components.

16. The apparatus of claim 13, which is used to enrich or recycle the olefins in the gas stream from a refinery gas, steam cracking plant, a gas stream from an oil field, or a venting gas from a propylene polymerization plant.

17. The apparatus of claim 16, wherein the olefins are light hydrocarbons obtained from fluidized catalytic cracking.

18. The apparatus of claim 1, further comprising an inlet for receipt of a sweep gas.

19. The apparatus of claim 1, wherein the porous substrate is coated with one or more nanoparticle seed layers suspended in an aqueous solution having a pH between six and eight, wherein the nanoparticle seeds comprise at least one of sodium chloride, potassium chloride, potassium fluoride, titanium oxide, sodium silicate, and water.

20. A method of separating olefin from an olefin/paraffin mixture, comprising the steps of:
  (a) injecting an olefin/paraffin fluid into a container comprising a porous membrane;
  (b) applying the fluid to one side of the membrane,
  (c) discharging an olefin enriched portion of the fluid that passes through the membrane;
  (d) discharging an olefin depleted fluid that remains on said one side of the membrane,
  wherein the membrane is a metal-doped zeolite membrane comprising a porous substrate and a zeolite layer thereon having pores with metal clusters in the zeolite pores, wherein the clusters comprise a metal or metal alloy of at least one transition metal selected from the group consisting of copper, silver, gold, cobalt, nickel, ruthenium, and palladium.

* * * * *